US009632579B2

(12) United States Patent
Kim et al.

(10) Patent No.: US 9,632,579 B2
(45) Date of Patent: Apr. 25, 2017

(54) DEVICE AND METHOD OF PROCESSING IMAGE (71) Applicant: SAMSUNG ELECTRONICS CO., LTD., Suwon-si (KR)

(72) Inventors: Hong-il Kim, Yongin-si (KR); Tae-hwa Hong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 44 days.

(21) Appl. No.: 14/711,001

(22) Filed: May 13, 2015

(65) Prior Publication Data
US 2015/0332091 A1 Nov. 19, 2015

(30) Foreign Application Priority Data

May 13, 2014 (KR) .................. 10-2014-0057448

(51) Int. Cl.
G06K 9/00 (2006.01)
G06F 3/01 (2006.01)
G06K 9/46 (2006.01)
G06T 7/00 (2017.01)
G06T 13/00 (2011.01)
G06T 1/00 (2006.01)
(Continued)

(52) U.S. Cl.
CPC .............. *G06F 3/01* (2013.01); *G06F 3/013* (2013.01); *G06K 9/00* (2013.01); *G06K 9/00604* (2013.01); *G06K 9/46* (2013.01); *G06K 9/4671* (2013.01); *G06T 1/0007* (2013.01); *G06T 1/20* (2013.01); *G06T 7/003* (2013.01); *G06T 13/00* (2013.01); *H04N 5/4448* (2013.01); *G06K 2209/21* (2013.01); *G06T 2207/10004* (2013.01); *G06T 2207/10016* (2013.01); *G06T 2207/30196* (2013.01); *G06T 2207/30232* (2013.01); *G06T 2210/22* (2013.01); *G06T 2210/61* (2013.01); *G06T 2213/08* (2013.01)

(58) Field of Classification Search
CPC .......... G06K 9/00604; G06K 2209/21; G06K 9/4671; G06T 2210/61; G06T 7/003; G06T 13/00; G06T 1/0007; G06T 2213/08; G06T 2207/10004; G06T 2207/10016; G06T 2207/30196; G06T 2207/30232; G06T 2210/22; G06F 3/013; H04N 5/4448
USPC ........................................................ 382/103
See application file for complete search history.

(56) References Cited

U.S. PATENT DOCUMENTS 7,259,785 B2    8/2007  Stavely et al.
7,930,199 B1 *  4/2011  Hill ................... G06F 17/30259
                                                    382/118

(Continued)

FOREIGN PATENT DOCUMENTS

KR    10-2011-0017236 A    2/2011

*Primary Examiner* — Gregory F Cunningham
(74) *Attorney, Agent, or Firm* — Sughrue Mion, PLLC (57) ABSTRACT An image processing device includes a first imaging unit configured to capture an image including an object; a display configured to display the image captured by the first imaging unit; a second imaging unit configured to capture a position of eyes of a user; a gaze map generator configured to generate a gaze map including information about a gaze zone on the display according to passage of time based on the position of the eyes; and an image processor configured to generate a motion picture based on the generated gaze map and the captured image.

26 Claims, 9 Drawing Sheets (51) Int. Cl.
*H04N 5/44* (2011.01)
*G06T 1/20* (2006.01)

(56) References Cited

U.S. PATENT DOCUMENTS

| | | | |
|---|---|---|---|
| 8,020,993 B1* | 9/2011 | Fram | G06F 3/013 351/200 |
| 2008/0285853 A1* | 11/2008 | Bressan | G06T 5/009 382/169 |
| 2012/0094700 A1* | 4/2012 | Karmarkar | G06F 3/013 455/466 |
| 2012/0274905 A1* | 11/2012 | Johansson | A61B 3/024 351/224 |
| 2013/0083173 A1* | 4/2013 | Geisner | G06F 3/013 348/51 |
| 2013/0148910 A1* | 6/2013 | Fredembach | G06K 9/4638 382/275 |
| 2014/0002444 A1* | 1/2014 | Bennett | G06F 3/012 345/419 |
| 2015/0128075 A1* | 5/2015 | Kempinski | G06F 3/012 715/765 |

* cited by examiner

DEVICE AND METHOD OF PROCESSING IMAGE

CROSS-REFERENCE TO RELATED APPLICATIONS

This application claims priority from Korean Patent Application No. 10-2014-0057448, filed on May 13, 2014 in the Korean Intellectual Property Office, the disclosure of which is incorporated herein in its entirety by reference.

BACKGROUND

1. Field

Apparatuses and methods consistent with exemplary embodiments relate to a device and method of processing an image which may reproduce scenes that a user actually saw during image capturing according to passage of time.

2. Description of the Related Art

Image capturing apparatuses such as cameras or camcorders have been widely distributed not only to professional consumers but also to general consumers. With development of digital technology, digital Image capturing apparatuses are recently distributed. In particular, the digital Image capturing apparatuses are distributed by being included in portable terminals such as smartphones or tablets. An image captured by the digital Image capturing apparatus may have a digital image format.

A digital image may be processed by various methods according to purposes. A digital image captured by using the digital Image capturing apparatus may be very easily edited or processed compared to an image captured by using a film in the past. For example, a digital image may be processed in order to improve quality of an image. Also, as the digital image is processed, noise included in the digital image may be removed.

The technology of processing a digital image is continuously under development. In addition to the technology of improving a digital image by processing the digital image, technology of detecting useful information from a digital image or technology of acquiring a useful image that is converted from a digital image is being developed. For example, in an image, a direction in which a person gazes or an area of the image at which the person gazes may be detected by measuring eye positions and eye movement of the person.

SUMMARY

One or more exemplary embodiments include a device and method of processing an image which may reproduce scenes that a user actually saw during image capturing according to passage of time.

One or more exemplary embodiments include a device and method of processing an image which may emphasize an object in a motion picture, the object being gazed by a user during image capturing of the motion picture.

According to an exemplary embodiment, there is provided an image processing device including: a first imaging unit configured to capture an image including an object; a display configured to display the captured image; a second imaging unit configured to capture a position of eyes of a user; a gaze map generator configured to generate a gaze map including information about a gaze zone on the display according to passage of time based on the position of the eyes; and an image processor configured to generate a motion picture based on the generated gaze map and the captured image.

The captured image may be a preview image, and the image processor may be further configured to generate a motion picture based on the generated gaze map and the preview image captured at a predetermined time interval.

The gaze map generator may be further configured to detect a change in the gaze zone for a particular time interval by processing information of the position of the eyes of the user and generate the gaze map based on the detected change in the gaze zone.

The image processor may be further configured to determine the gaze zone at each time point from the gaze map and generate a motion picture that provides an animation effect of enlarging, reducing, or moving the captured image according to the gaze zone in the captured image.

The first imaging unit may be further configured to capture a preview image until a still image capturing signal is input, capture a still image when the still image capturing signal is input, and store the captured still image in a storage.

The second imaging unit may be further configured to continuously capture the position of the eyes of the user until the still image capturing signal is input.

The image processor may be further configured to determine the gaze zone at each time point from the gaze map, and generate a plurality of cropped images by cropping an area around the gaze zone from the stored still image.

The image processor may be further configured to generate the motion picture by incorporating the generated plurality of cropped images.

When the gaze zone moves within a range equal to or less than a second threshold value for a time over a first threshold value, the image processor may enlarge the captured still image with respect to the gaze zone and crop the enlarged still image.

The gaze zone may correspond to a part of the object included in the stored still image, and the image processor may be further configured to enlarge the stored still image at a magnification ratio calculated by using a ratio of an overall size of the object to an overall size of the stored still image.

The first imaging unit may be further configured to capture a motion picture and store the captured motion picture in a storage, the display may be further configured to display a preview image of the motion picture captured by the first imaging unit, and the image processor may be further configured to edit the stored motion picture by using the generated gaze map.

The image processor may be further configured to determine the gaze zone at each time point from the gaze map, and crop an area around the gaze zone at a time point corresponding to each frame included in the stored motion picture.

The image processor may be further configured to generate a cropped motion picture by incorporating a plurality of cropped frames.

The image processor may be further configured to store the cropped motion picture in the storage.

The image processor may be further configured to determine importance for each frame of the stored motion picture based on the gaze map, and adjust a reproduction speed of the stored motion picture or emphasize at least one frame based on the determined importance when a user interface for reproducing or editing the stored motion picture is provided.

According to another aspect of an exemplary embodiment, there is provided an image processing method including: capturing an image including an object by a first imaging unit; displaying the captured image on a display; capturing a position of eyes of a user by a second imaging unit; generating a gaze map including information about a gaze zone on the display according to passage of time based on the position of the eyes of the user; and generating a motion picture based on the generated gaze map and the captured image.

The captured image may be a preview image, and the generating the motion picture may include generating the motion picture based on the generated gaze map and the preview image captured at a predetermined time interval.

The generating the motion picture may include: determining the gaze zone at each time point from the gaze map; and generating a plurality of cropped images by cropping an area around the determined gaze zone corresponding to the time point at each time point in the captured image.

The generating the motion picture may include generating the motion picture by incorporating the plurality of generated cropped images.

The capturing the image may include: capturing a preview image until a still image capturing signal is input; capturing a still image when the still image capturing signal is input; and storing the captured still image in a storage.

The gaze zone may correspond to a part of the object included in the stored still image, and the capturing the still image may include: enlarging the stored still image at a magnification ratio calculated by using a ratio of an overall size of the object to an overall size of the stored still image when the gaze zone moves within a range equal to or less than a second threshold value for a time over a first threshold value; and cropping the enlarged still image.

The capturing the image may include capturing a motion picture and storing the captured motion picture in a storage, the displaying the captured image may include displaying a preview image of the captured motion picture, and the generating the motion picture may include editing the stored motion picture based on the generated gaze map.

The editing the stored motion picture may include: determining the gaze zone at each time point from the gaze map; and cropping an area around the determined gaze zone at a time point corresponding to the frame at each frame included in the stored motion picture.

The editing the motion picture may include: generating a cropped motion picture by incorporating a plurality of cropped frames; and storing the cropped motion pictures in the storage.

The editing the motion picture may include: determining importance for each frame of the stored motion picture based on the gaze map; and adjusting a reproduction speed of the stored motion picture or emphasizing at least one frame based on the determined importance when a user interface for reproducing or editing the stored motion picture is provided.

According to another aspect of an exemplary embodiment, there is provided a non-transitory computer readable storage medium storing a program that is executable by a computer to perform the image processing method.

BRIEF DESCRIPTION OF THE DRAWINGS

The above and/or other aspects will be more apparent by describing certain exemplary embodiments, with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Terms such as "first" and "second" are used herein merely to describe a variety of constituent elements, but the constituent elements are not limited by the terms. Such terms are used only for the purpose of distinguishing one constituent element from another constituent element. For example, without departing from the right scope of the present inventive concept, a first constituent element may be referred to as a second constituent element, and vice versa.

Terms used in the present specification are used for explaining a specific exemplary embodiment, not for limiting the present inventive concept. Thus, an expression used in a singular form in the present specification also includes the expression in its plural form unless clearly specified otherwise in context. Also, terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

Unless defined otherwise, all terms used herein including technical or scientific terms have the same meanings as those generally understood by those of ordinary skill in the art to which the present inventive concept may pertain. The terms as those defined in generally used dictionaries are construed to have meanings matching that in the context of related technology and, unless clearly defined otherwise, are not construed to be ideally or excessively formal.

In the following description, devices and methods of processing images according to exemplary embodiments are described in detail with reference to FIGS. 1 to 14.

Figure 1:
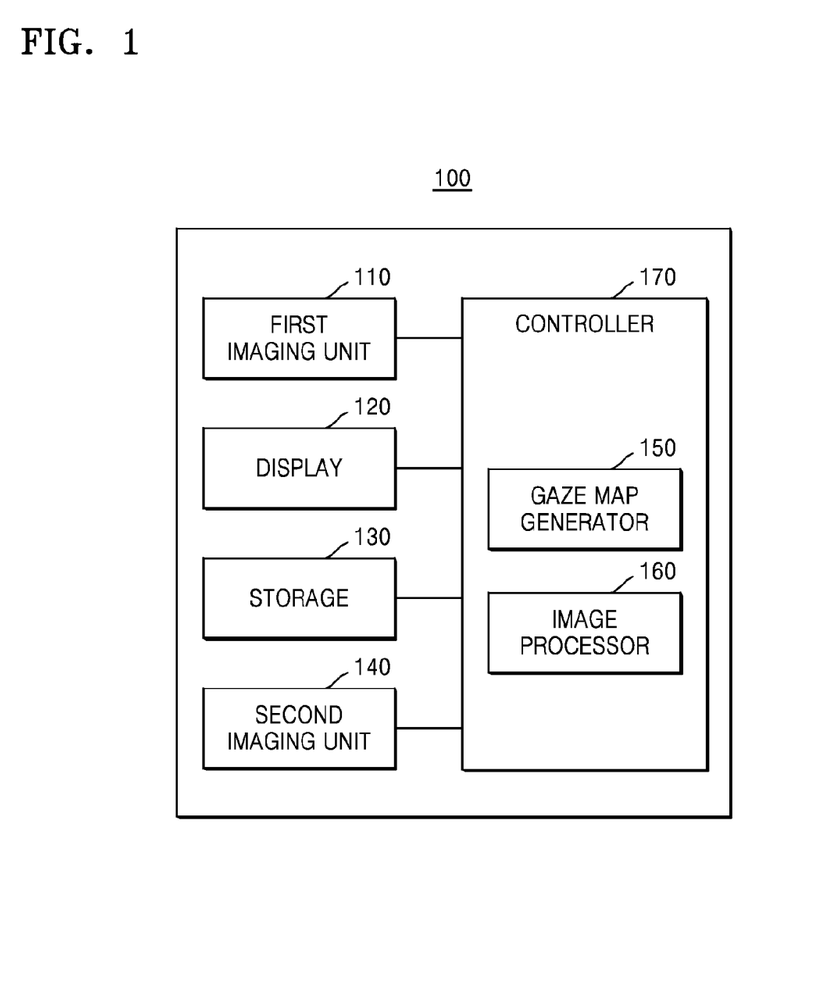
FIG. 1 is a block diagram illustrating a structure of an image processing device according to an exemplary embodiment.

FIG. 1 is a block diagram illustrating a structure of an image processing device 100 according to an exemplary embodiment. Only constituent elements related to the image processing device 100 according to the present exemplary embodiment are illustrated in FIG. 1. Accordingly, it is obvious that other common constituent elements may be further included in addition to the constituent elements illustrated in FIG. 1.

The image processing device 100 according to the present exemplary embodiment may include a digital single-lens reflex camera (DSLR), a mirror-less camera, or a smartphone or a wearable device. The image processing device 100 is not limited to the above structure and may include all devices equipped with a camera module capable of capturing an image of an object to generate an image, including a lens and an imaging device.

Referring to FIG. 1, the image processing device 100 may include a first imaging unit 110, a display 120, a storage 130, a second imaging unit 140, and a controller 170. Also, the controller 170 may include a gaze map generator 150 and an image processor 160.

The first imaging unit 110 may capture an image. An image captured by the first imaging unit 110 may include at least one object. The first imaging unit 110 may include a camera or other Image capturing apparatuses capable of capturing an image of an object. The first imaging unit 110 may include a camera lens. A user may capture an image of the object as the camera lens included in the first imaging unit 110 faces the object. In the following description, the image captured by the first imaging unit 110 may be a still image, a motion picture, or a preview image.

The display 120 may display an image captured by the first imaging unit 110. For example, the display 120 may display the preview image, still image, or motion picture which are captured by the first imaging unit 110. The display 120 may include a display apparatus. The display 120 may include, for example, a flat panel display apparatus such as a liquid crystal display (LCD), an organic light-emitting diode (OLED), or a plasma display panel (PDP). The display 120 may include a curved display or a flexible display. The display 120 may include a touch screen.

The display 120 may be arranged at the opposite side to a portion where the first imaging unit 110 is arranged, in the image processing device 100. For example, the face of a user may be located at the opposite side to a portion where the object is located with respect to the image processing device 100. When the first imaging unit 110 faces the object, the display 120 may face the face of a user. The user may check, through the display 120, an image that is captured or is being captured by the first imaging unit 110.

The storage 130 may store the image captured by the first imaging unit 110. For example, when the user wants to capture a still image, the first imaging unit 110 may continuously capture a preview image including the object. The preview image captured by the first imaging unit 110 may be displayed on the display 120. The preview image may be an image obtained by sampling the image captured by the first imaging unit 110 with a low resolution so as to be quickly displayed on the display 120. The user may check, through the display 120, whether the object that the user wants to capture is properly included in the image.

In this state, the user may gaze at an area of the image where the object is displayed on the display 120. When the object to be captured is properly included in the image, the user may take a predetermined action or gesture to trigger commands with the action or gesture. For example, when the user presses a button or touches an icon, the first imaging unit 110 may capture a still image and the captured still image may be stored in the storage 130.

Also, when the user captures a motion picture, the first imaging unit 110 may continuously capture the preview image. The preview image captured by the first imaging unit 110 may be displayed on the display 120 in real time. The user may check, through the display 120, whether the object to be captured is properly included in the image.

When the object to be captured is properly included in the image, the user may take a predetermined action. For example, when the user presses a button or touches an icon, the first imaging unit 110 may start to capture a motion picture. Also a preview image of a motion picture being captured may be displayed in real time on the display 120. While the preview image of the motion picture being captured is currently displayed on the display 120, the user gazes at an area of the image where the object is displayed on the display 120.

Accordingly, when the object moves or the image processing device 100 moves while the first imaging unit 110 is capturing a motion picture and thus the area of the object changes in the image displayed on the display 120, the area of the motion picture at which the user gazes may vary according to the changed area of the object. When the user stops storing continuous images as a motion picture, the user may take a predetermined action. For example, when the user presses a button or touches an icon, the first imaging unit 110 may terminate the capturing process of the motion picture. The captured motion picture may be stored in the storage 130 through a predetermined image process.

The second imaging unit 140 may capture an image of eyes of the user who views the display 120. While the user checks an image captured by the first imaging unit 110, through the display 120, the second imaging unit 140 may continuously capture the image of the eyes of the user who views the display 120. The second imaging unit 140 may include a camera, an infrared camera, or other image capturing apparatuses. When the second imaging unit 140 includes an infrared camera, the second imaging unit 140 may further include an infrared light-emitting device.

When the user wants to capture a still image, the first imaging unit 110 may continuously capture a preview image including the object. The preview image captured by the first imaging unit 110 may be displayed on the display 120. Before a still image is captured according to a user's action, for example, by an input of a capturing signal, and stored in the storage 130, the user may check, through the display 120, whether the object is properly included in the image.

In this state, the user may gaze at a position where the object is displayed on the display 120. The second imaging unit 140 may capture the image of the eyes of the user who views the display 120 before the storage 130 stores the image as a still image according to the user's action. In other words, before the user takes an action to store the image as a still image, the second imaging unit 140 may continuously capture the image of the eyes of the user who checks a content of the image. When the user takes an action to capture a still image, the second imaging unit 140 may terminate the capturing of the eyes of the user.

Also, when the user captures a motion picture, a preview image of the image captured by the first imaging unit 110 may be continuously displayed. While the preview image currently displayed on the display 120 is captured as a motion picture, the user may gaze at an area where the object is displayed on the display 120. The second imaging unit 140 may continuously capture the image of the eyes of the user while the motion picture is captured. When the user takes an action to terminate the continuous capturing process of a motion picture, the second imaging unit 140 may terminate the capturing of the eyes of the user.

The controller 170 controls an overall operation of the image processing device 100. In other words, the controller 170 may control operations of the first imaging unit 110, the display 120, the storage 130, and the second imaging unit 140. The controller 170 may correspond to one or a plurality of processors. The processor may be embodied by an array of a plurality of logic gates or by a combination of a general purpose microprocessor and a memory storing a program executable in the microprocessor. Also, the process may be embodied by hardware of a different type. Also, the controller 170 may include the gaze map generator 150 and the image processor 160 which are described below.

The gaze map generator 150 may generate a gaze map including information about the area at which the user gazes on the display 120 according to a passage of time, by using the image of the eyes of the user captured by the second imaging unit 140. While the user checks, through the display 120, the image captured by the first imaging unit 110, the user may gaze at the area on the display 120. While the user checks the image, the user may continuously gaze at only one area on the display 120 or different areas according to passage of time.

The gaze map generator 150 may detect the area at which the user gazes on the display 120, by processing the image of the eyes of the user captured by the second imaging unit 140. Also, the gaze map generator 150 may detect a change in the area at which the user gazes for a particular time interval. The gaze map generator 150 may generate a gaze map by using a result of the detection. The gaze map may include information about the area at which the user gazes according to passage of time.

Figure 2:
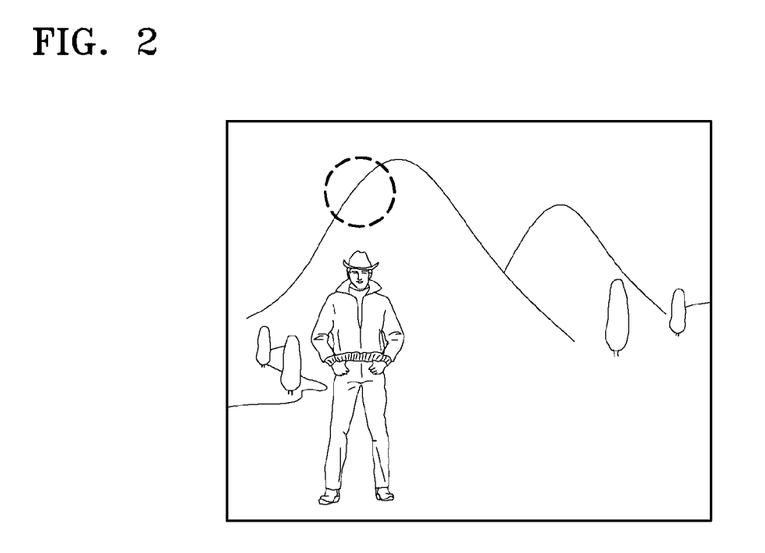
FIG. 2 is a reference view illustrating the gaze of a user at a particular time point during image capturing.

FIG. 2 is a reference view illustrating the gaze of a user at a particular time point while an image is being capturing. As illustrated in FIG. 2, an image including a person and a background may be displayed on the display 120. The user may view the upper left end of the display 120. Referring to FIG. 2, the area at which the user gazes is displayed as a dashed circle on the display 120.

Figure 3:
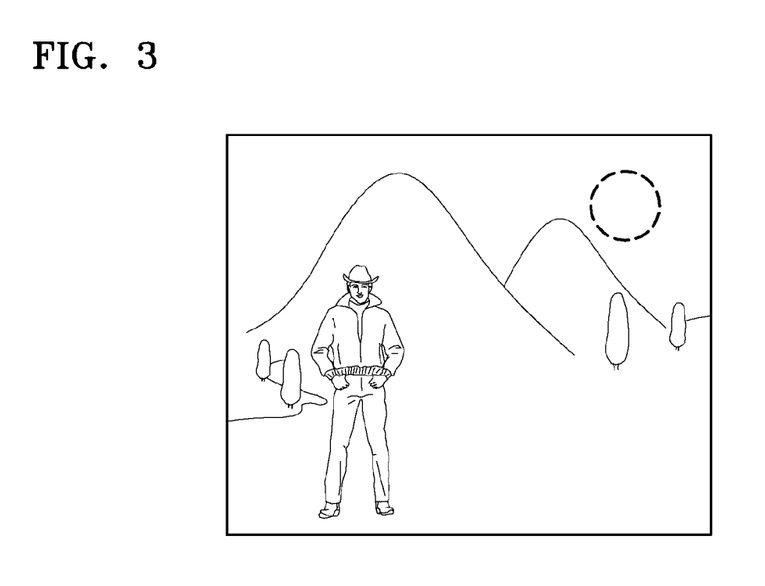
FIG. 3 is a reference view illustrating the gaze of a user at another time point during image capturing.

FIG. 3 is a reference view illustrating the gaze of a user at another time point while an image is being capturing. The user may view first the upper left end of the display 120, as illustrated in the exemplary embodiment of FIG. 2, and then the upper right end of the display 120. Referring to FIG. 3, the area at which the user gazes is displayed as a dashed circle on the display 120.

Figure 4:
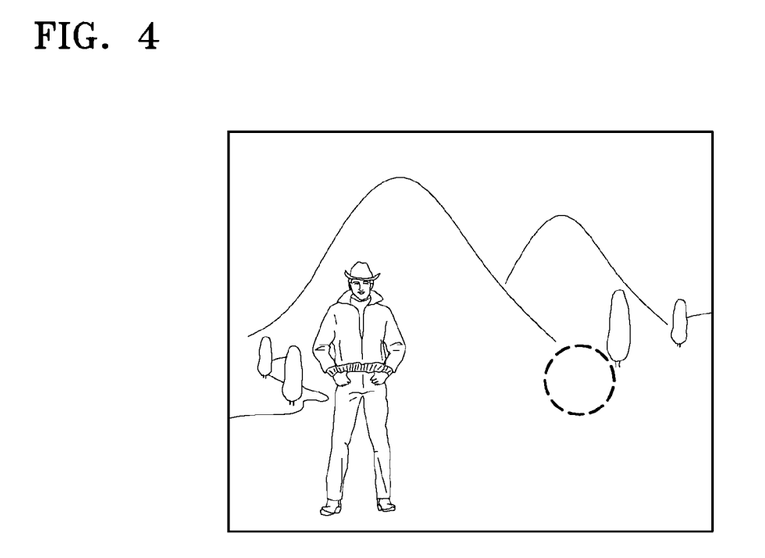
FIG. 4 is a reference view illustrating the gaze of a user at another time point during image capturing.
Figure 5:
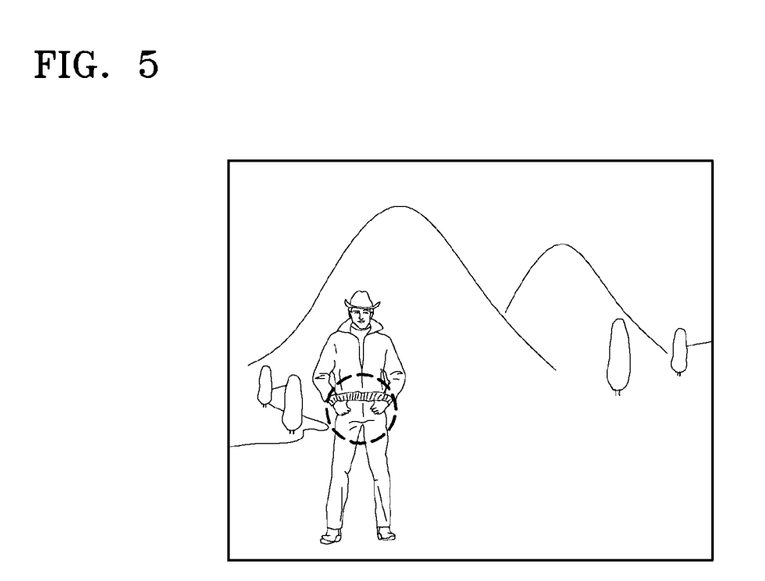
FIG. 5 is a reference view illustrating the gaze of a user at another time point during image capturing.

FIG. 4 is a reference view illustrating the gaze of a user at another time point while an image is being capturing. The user may firstly view the upper right end of the display 120, as illustrated in the exemplary embodiment of FIG. 3, and then view the lower right end of the display 120. Referring to FIG. 4, the area at which the user gazes is displayed as a dashed circle on the display 120. FIG. 5 is a reference view illustrating the gaze of a user at another time point while an image is being capturing. The user may firstly view the lower right end of the display 120, as illustrated in the exemplary embodiment of FIG. 4, and then view the lower left end of the display 120. Referring to FIG. 5, the area at which the user gazes is displayed as a dashed circle on the display 120.

The image processor 160 may generate a motion picture by using the generated gaze map and the stored still image. The image processor 160 may read the gaze map and determine the area at which the user gazes at each time point according to passage of time. The image processor 160 may crop a part of the stored still image including the area at which the user gazes (hereinafter, referred to as the "gaze zone"). The image processor 160 may generate one cropped image at each time point included in the gaze map. In other words, the image processor 160 may generate a plurality of cropped images by cropping the stored still image at each time point by using the gaze zone corresponding to the time point. Also, the image processor 160 may generated a motion picture by incorporating the generated cropped images. The generated motion picture may be a thumbnail motion picture or a slideshow image.

Figure 6:
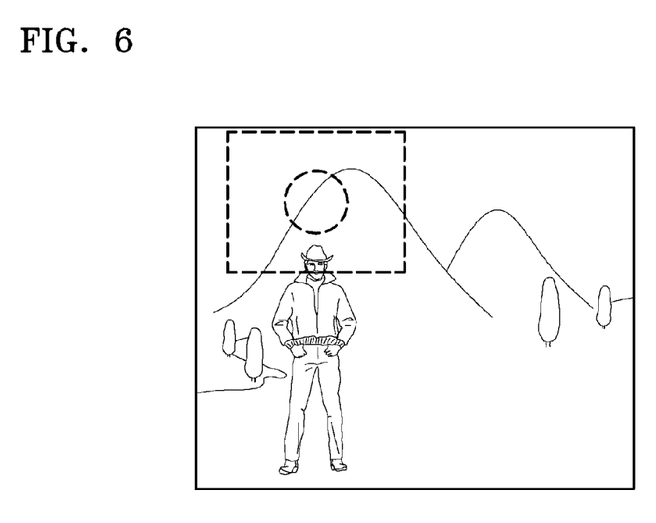
FIG. 6 is a reference view for explaining a method of processing an image by using a gaze map.

Alternatively, the image processor 160 may process a captured motion picture by using the generated gaze map. For example, the image processor 160 may generate a cropped motion picture by cropping each frame of the captured motion picture by using the gaze zone, like cropping the still image by using the gaze zone. FIG. 6 is a reference view for explaining a method of processing an image by using a gaze map. The user may view the upper left end of the display 120 at a particular time point. Referring to FIG. 6, the gaze zone is displayed as a circle indicated by a dashed line. The image processor 160 may crop an area around the gaze zone. Referring to FIG. 6, the area around the gaze zone may be displayed as a dashed rectangle. The image processor 160 may crop the dashed rectangular portion of the stored still image.

Figure 7:
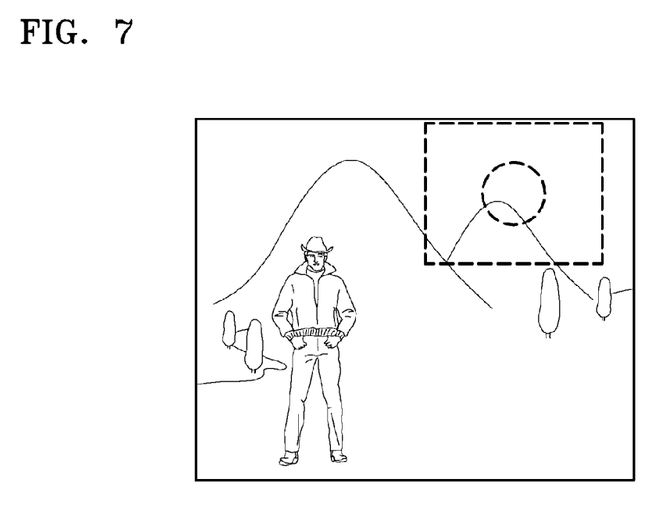
FIG. 7 is another reference view for explaining a method of processing an image by using a gaze map.

FIG. 7 is another reference view for explaining a method of processing an image by using a gaze map. The user may view the upper left end of the display 120 as illustrated in FIG. 6 and then the upper right end of the display 120. Referring to FIG. 7, the gaze zone is displayed as a dashed circle. The image processor 160 may crop an area around the gaze zone. Referring to FIG. 7, the area around the gaze zone may be displayed as a dashed rectangle. The image processor 160 may crop the dashed rectangular portion of the stored still image.

Figure 8:
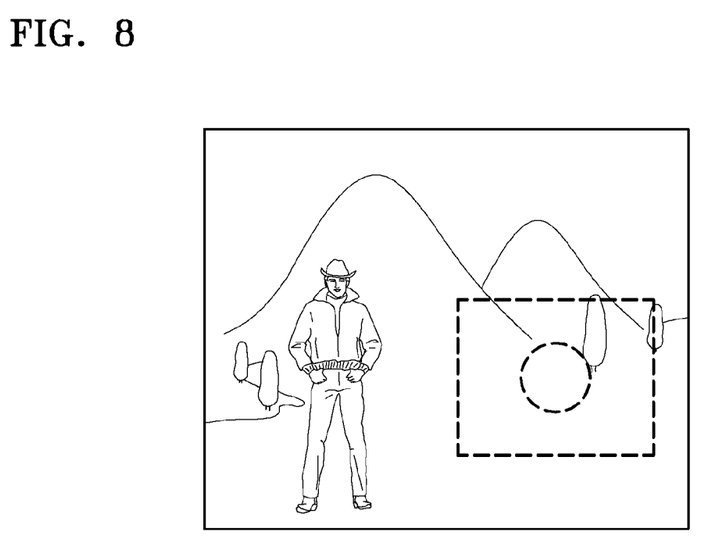
FIG. 8 is another reference view for explaining a method of processing an image by using a gaze map.

FIG. 8 is another reference view for explaining a method of processing an image by using a gaze map. The user may view the upper right end of the display 120 as illustrated in FIG. 7 and then the lower right end of the display 120. Referring to FIG. 8, the gaze zone is displayed as a dashed circle. The image processor 160 may crop an area around the gaze zone. Referring to FIG. 8, the area around the gaze zone may be displayed as a dashed rectangle. The image processor 160 may crop the dashed rectangular portion indicated of the stored still image.

Figure 9:
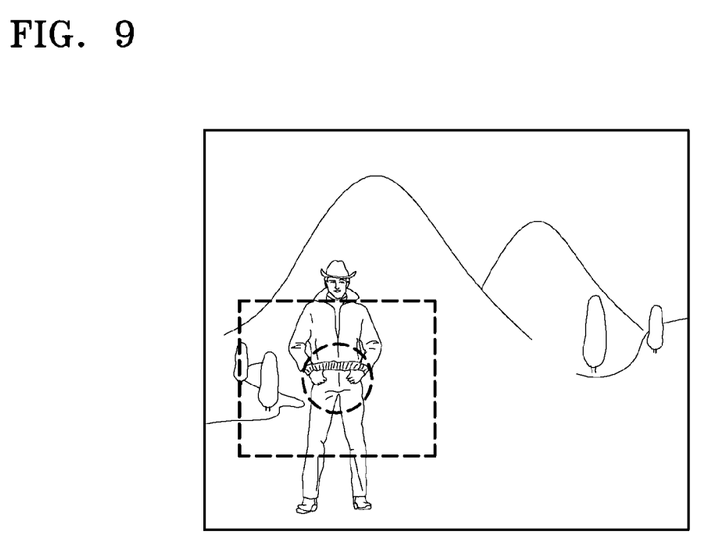
FIG. 9 is another reference view for explaining a method of processing an image by using a gaze map.

FIG. 9 is another reference view for explaining a method of processing an image by using a gaze map. The user may view the lower right end of the display 120 as illustrated in FIG. 8 and then the lower left end of the display 120. Referring to FIG. 9, the gaze zone is displayed as a dashed circle. The image processor 160 may crop an area around the gaze zone. Referring to FIG. 9, the area around the gaze zone may be displayed as a dashed rectangle. The image processor 160 may crop the dashed rectangular portion of the stored still image.

The image processor 160 may generate a motion picture by using a plurality of generated cropped images. The image processor 160 may incorporate the generated cropped images. For example, the generated motion picture may be a moving thumbnail.

The generated motion picture may include a cropped image corresponding to each time point. For example, the image processor 160 may generate a motion picture including four cropped images generated in the exemplary embodiments of FIGS. 6 to 9. When the generated motion picture is reproduced, the four cropped images may be continuously displayed according to passage of time.

A cropped image corresponding to a particular time point includes an area around the gaze zone at the particular time point. Accordingly, when the generated motion picture is reproduced, the scenes that the user actually saw according to the passage of time may be reproduced.

When the gaze zone moves within a range equal to or less than a predetermined threshold value for the time over a predetermined threshold value, the user may be interpreted to view the gaze zone with care. When the gaze zone moves within a range equal to or less than a predetermined threshold value for the time over a predetermined threshold value, the image processor 160 may enlarge the still image with respect to the gaze zone and crop an area around the gaze zone. Accordingly, the object that the user viewed with care may be emphasized in the motion picture.

The image processor 160 may enlarge the stored still image at a predetermined magnification ratio with respect to the gaze zone and then perform cropping. According to another exemplary embodiment, when the gaze zone corresponds to a part of a particular object, the image processor 160 may enlarge the stored still image such that the whole of the particular object completely fills an area to be cropped and then perform cropping. For example, the image processor 160 may segment an object included in an image by analyzing a frequency of the gaze zones and a gaze time in the image, and perform cropping such that an area including a predetermined portion of the object that is segmented according to the analyzed gaze zone frequency and gaze time is enlarged. In another example, an object included in an image is first segmented, and then, cropping is performed to enlarge a predetermined portion of the image by using the gaze zone frequency and gaze time of each segmented object.

Accordingly, when a ratio of the overall size of the particular object to the overall size of the stored still image is relatively small, the stored still image may be enlarged at a relatively high magnification ratio, compared to a case in which the above size ratio is relatively large. The image processor 160 may calculate the magnification ratio by using the above size ratio and enlarge the stored still image at the calculated magnification ratio.

Figure 10:
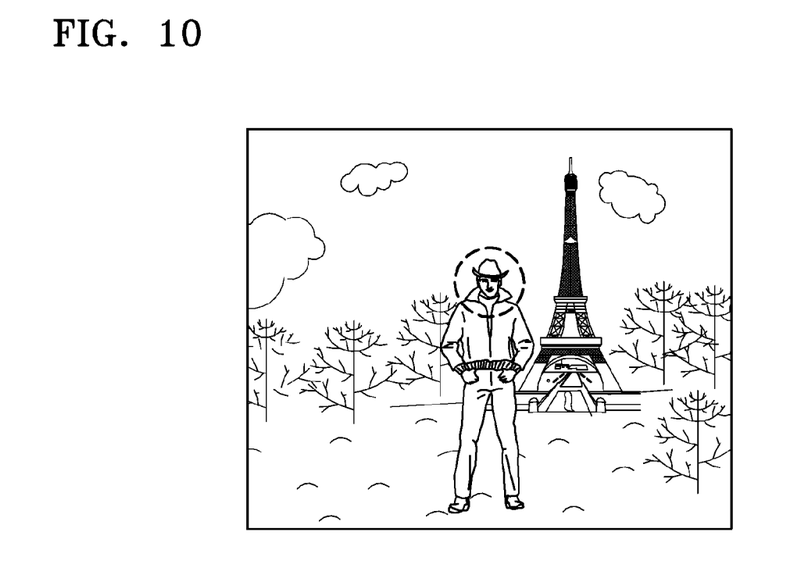
FIG. 10 is a reference view illustrating the gaze of a user during image capturing according to another exemplary embodiment.

For example, the display 120 may display a preview image including a person and a background. The user may continuously view a face portion of a person in an image for the time over a predetermined threshold value. Referring to FIG. 10, the gaze zone is displayed as a dashed circle. Accordingly, the image processor 160 may segment the object of an image, for example, segmenting the person and the background in FIG. 10, and crop the image such that a predetermined object area, for example, an area including the whole body of the person in FIG. 10, is displayed to be enlarged with respect to the gaze zone displayed as a circle.

Figure 11:
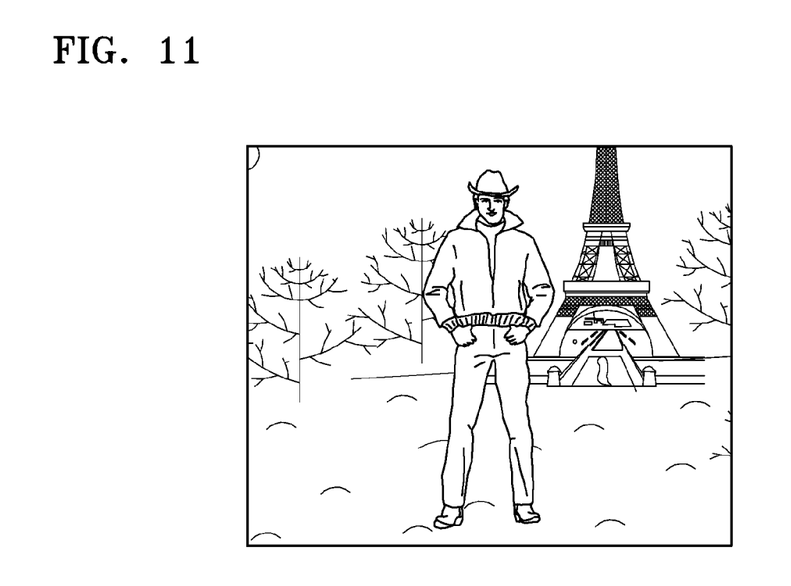
FIG. 11 is a reference view for explaining another method of processing an image by using a gaze map.

A degree of the enlargement of the predetermined object area may be determined according to the gaze zone frequency and the gaze time. FIG. 11 illustrates a result of the enlargement and cropping of the area including the whole body of the person, as described above.

According to another exemplary embodiment, the image processor 160 may process the stored motion picture by using the generated gaze map. The image processor 160 may read the gaze map and determine the gaze zone at each time point. The image processor 160 may crop an area around the gaze zone at a time point corresponding to each of frames included in the stored motion picture.

For example, the stored motion picture may include four frames and the four frames may sequentially correspond to FIGS. 6 to 9. At the first frame, the image processor 160 may crop the dashed rectangular portion in FIG. 6. Also, at the second frame, the image processor 160 may crop the dashed rectangular portion in FIG. 7. Also, at the third frame, the image processor 160 may crop the dashed rectangular portion in FIG. 8. Also, at the fourth frame, the image processor 160 may crop the dashed rectangular portion in FIG. 9.

Also, when the gaze zone moves within a range equal to or less than a predetermined threshold value for the time over a predetermined threshold value, the image processor 160 may enlarge a frame included in the stored motion picture with respect to the gaze zone and crop an area around the gaze zone. Accordingly, the object that the user viewed with care may be emphasized in the motion picture.

Since the cropped frame corresponding to the particular time point includes the image around the gaze zone at the particular time point, when the motion picture processed by the image processor 160 is reproduced, the scenes that the user actually saw according to the passage of time may be reproduced.

In an image processing method according to another exemplary embodiment, only a predetermined area around the gaze zone may be tracked and captured when the first imaging unit 110 captures a motion picture. For example, when the image processing device 100 captures a motion picture, a plurality of images are captured and each captured image is stored in the storage 130 as one frame by performing image encoding according to a motion picture compression standard. In the image processing method according to the present exemplary embodiment, the gaze zone is tracked in the captured images and a predetermined area around the gaze zone is cropped. Only a cropped area in each image may be encoded and stored in the storage 130. In this case, since only a cropped motion picture is stored in the storage 130, there may be an advantage in the storage capacity and a new type of a motion picture may be provided to users.

In an image processing method according to another exemplary embodiment, the gaze information may be used for editing and reproducing a motion picture. For example, when the image processing device 100 edits and reproduces a motion picture, a portion that hardly includes the gaze information may be quickly reproduced or may be skipped during reproduction.

Figure 12:
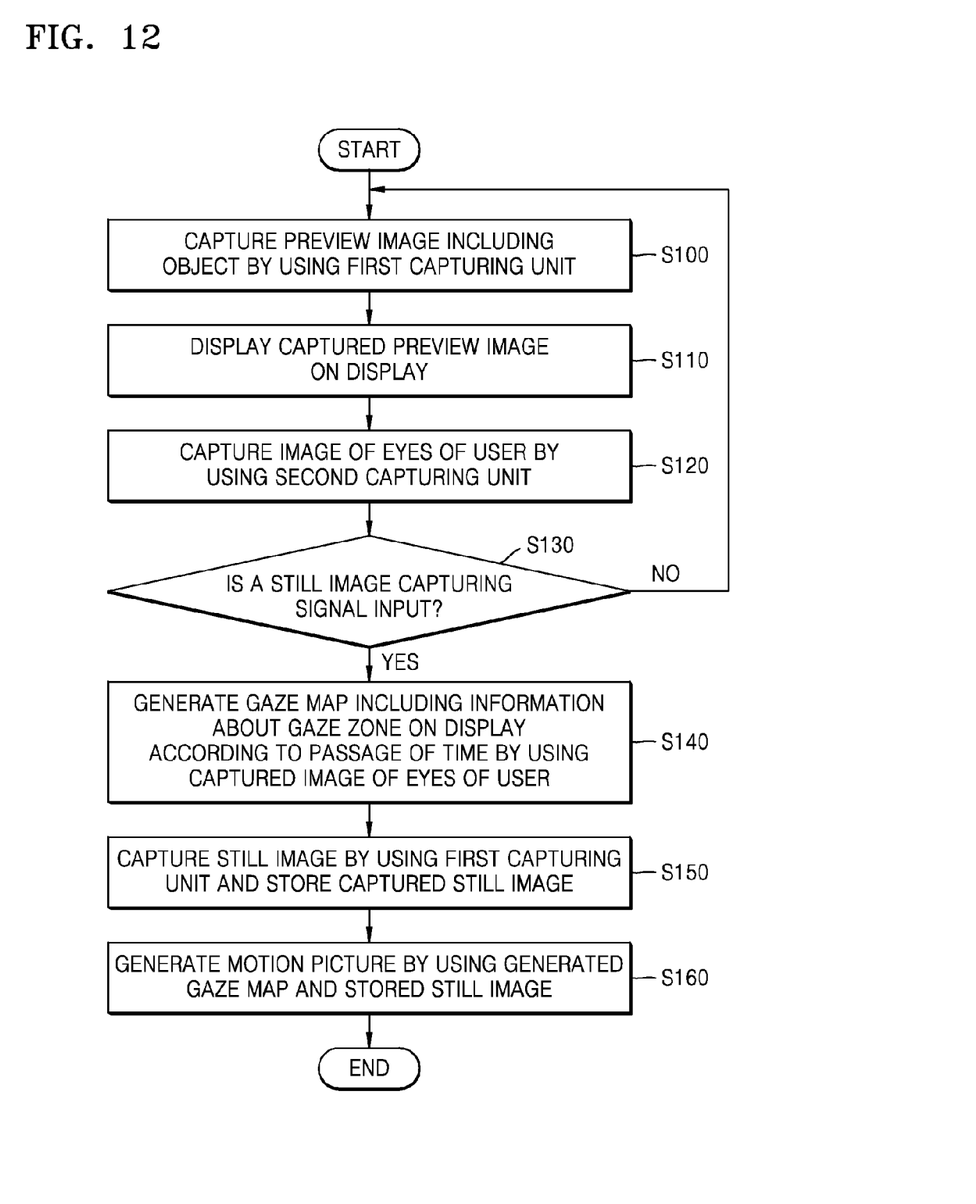
FIG. 12 is a flowchart for explaining a method of processing an image according to an exemplary embodiment.
Figure 13:
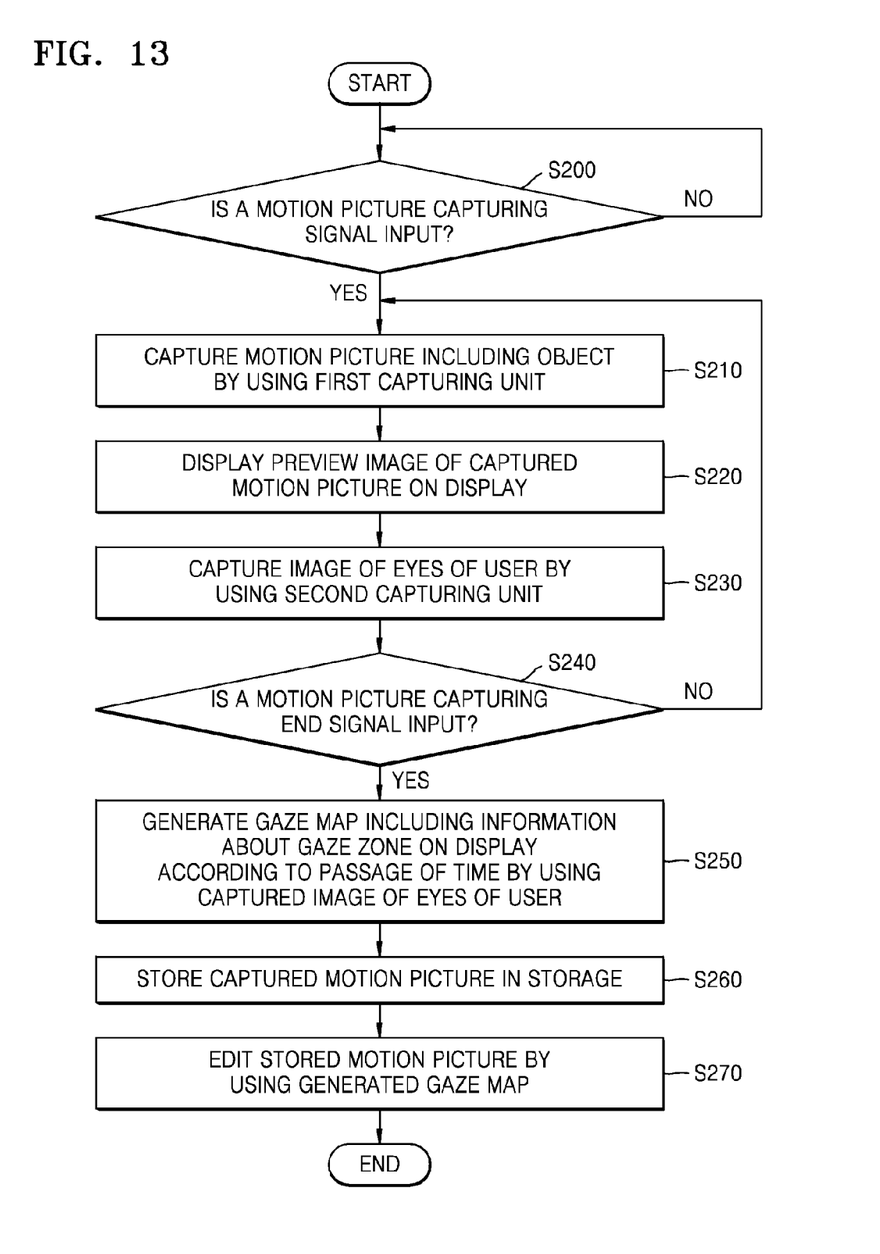
FIG. 13 is a flowchart for explaining a method of processing an image according to another exemplary embodiment.

In the following description, methods of processing images according to exemplary embodiments are described with reference to FIGS. 12 and 13. In FIGS. 12 and 13, each image processing method includes a plurality of operations that are time-serially processed by the image processing device 100 of FIG. 1. Accordingly, although omitted in the following description, the above-described descriptions on the image processing device 100 of FIG. 1 are obviously applied to the methods of FIGS. 12 and 13.

FIG. 12 is a flowchart for explaining a method of processing an image according to an exemplary embodiment.

Referring to FIG. 12, in operation S100, the first imaging unit 110 may capture a preview image including an object.

In operation S110, the image processing device 100 may display a captured preview image on the display 120.

In operation S120, the image processing device 100 may capture an image of eyes of a user viewing the displayed preview image.

In operation S130, the image processing device 100 may determine whether a still image capturing signal is input. The still image capturing signal may be a signal generated by pressing a shutter button or selecting an icon of the image processing device 100 as a user's action to capture a still image.

As the image processing device 100 repeatedly performs the operations S100 to S130 until the still image capturing signal is input, the user may check whether an object to be captured is displayed at a predetermined area on the display 120. Also, the second imaging unit 120 may continuously capture the image of the eyes of the user until the still image capturing signal is input.

When the still image capturing signal is input, in S140, the gaze map generator 150 may generate a gaze map including information about the gaze zone on the display 120 according to passage of time by using the captured image of the eyes of the user. The gaze map generator 150 may detect a change in the gaze zone for a particular time interval by processing the image of the eyes, and generate a gaze map by using the detected change in the gaze zone.

In the present exemplary embodiment, the gaze map is not necessarily limited to be generated after the still image capturing signal is input. For example, when the image processing device 100 enters a still image capturing mode, the gaze map is initialized. While the operations S100 to S130 are repeated, gaze map information is updated and thus the gaze map may be completed.

In operation S150, the first imaging unit 110 may capture a still image based on the input of a still image capturing signal, and the image processing device 100 may store a captured still image in the storage 130.

In operation S160, the image processor 160 may generate a motion picture by using the generated gaze map and the stored still image. The motion picture may be a thumbnail motion picture or a slideshow image.

For example, the image processor 160 may read the gaze zone at each particular time interval of the gaze map, and generate a motion picture that provides an animation effect of enlarging, reducing, or moving the stored still image according to the read gaze zone.

In another example, the image processor 160 may read the gaze zone at each particular time interval of the gaze map, and generate a plurality of cropped images by cropping a predetermined area around the gaze zone read from the image stored at each time point. Accordingly, the image processor 160 may generate a motion picture by incorporating the cropped images.

FIG. 13 is a flowchart for explaining a method of processing an image according to another exemplary embodiment.

First, in operation S200, the image processing device 100 determines whether a motion picture capturing start signal is input. The motion picture capturing start signal may be a signal generated by pressing a shutter button or selecting an icon.

If the motion picture capturing start signal is not input, the first imaging unit 110 captures a preview image and displays a captured preview image on the display 120.

In operation S210, when the motion picture capturing start signal is input, the first imaging unit 110 may capture a motion picture including an object. The captured motion picture may signify a frame for forming a motion picture having a predetermined length.

In operation S220, the image processing device 100 may display a preview image of the captured motion picture on the display 120. The preview image of the captured motion picture may signify an image that is processed to a low resolution so that the user may check the captured motion picture in real time.

In operation S230, the second imaging unit 120 may capture the image of the eyes of the user. In other words, while the first imaging unit 110 captures a motion picture, the second imaging unit 120 may capture the image of the eyes of the user.

In operation S240, the image processing device 100 may determine whether a motion picture capturing end signal is input. The motion picture capturing end signal may be a signal generated by releasing a pressed shutter button or selecting an icon.

Accordingly, as the image processing device 100 repeatedly performs the operations S210 to S240 until the motion picture capturing end signal is input, the eyes of the user viewing the display 120 may be captured at a predetermined interval during capturing of the motion picture In operation S250, the image processing device 100 may generate a gaze map including information about the gaze zone on the display 120 according to passage of time by using the captured image of the eyes of the user. The gaze map generator 150 may detect a change in the gaze zone for a particular time interval by processing the image of the eyes, and generate a gaze map by using the detected change in the gaze zone.

In the present exemplary embodiment, the gaze map is not necessarily limited to be generated after the motion picture capturing end signal is input. For example, when the image processing device 100 enters a motion picture capturing mode, the gaze map is initialized. While the operations S200 to S240 are repeated, the gaze map is updated during capturing of the motion picture and thus the gaze map may be completed.

In operation S260, the image processor 160 may store a captured motion picture in the storage 130. In another example, the image processor 160 may read the gaze zone at each frame of the captured motion picture based on the gaze map, instead of the captured motion picture, and store only a cropped motion picture, in which a predetermined area around the gaze zone is cropped at each frame, in the storage 130.

In S270, the image processor 160 may edit the stored motion picture by using the generated gaze map.

For example, the gaze zone is read at each time point from the gaze map and an area around the gaze zone may be cropped at each frame included in the stored motion picture. Also, the image processor 160 may generate a cropped motion picture by incorporating a plurality of cropped frames. The cropped motion picture may be used as a thumbnail motion picture.

In another example, the image processor 160 may provide a user interface for reproduction or edition of the stored motion picture. In this regard, importance is determined for each frame based on the gaze map, and a reproduction speed of a motion picture may be adjusted or at least one frame may be displayed to be emphasized based on the determined importance. For example, the image processor 160 may reproduce frames where gaze information is read out much in the motion picture captured based on the gaze map, slowly or by separately adding a highlight mark. Alternatively, by enlarging or cropping frames or areas having gaze information, the motion picture that is actually reproduced may be edited to be seen according to movement of a gaze, within a range of not changing the total motion picture time.

According to the above-described exemplary embodiments, the scenes that the user actually saw during image capturing according to passage of time may be reproduced. Also, the object that the user viewed with care may be emphasized in the motion picture.

Alternatively, although in FIGS. 12 and 13 the generation of a motion picture edited according to the gaze of a user during capturing of a still image or a motion picture is described, the present exemplary embodiment is not limited to the above structure.

Figure 14:
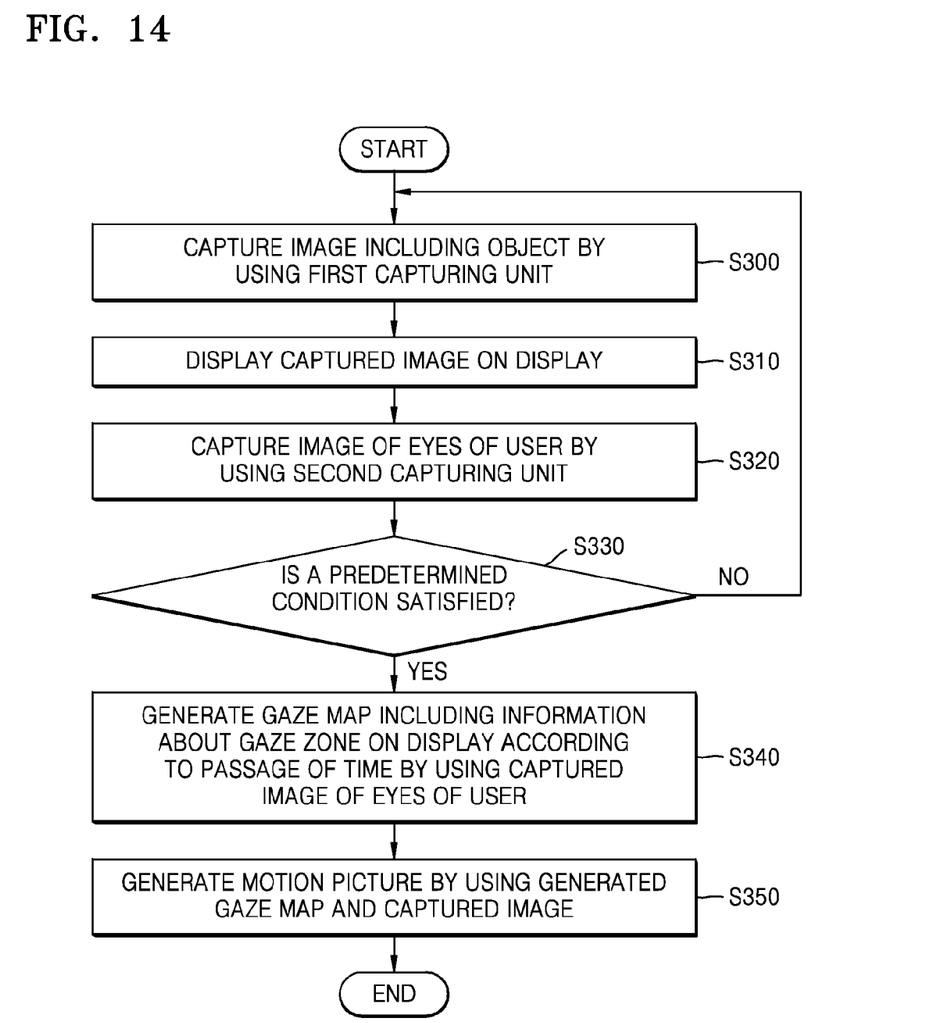
FIG. 14 is a flowchart for explaining a method of processing an image according to another exemplary embodiment.

For example, FIG. 14 is a flowchart for explaining a method of processing an image according to another exemplary embodiment.

Referring to FIG. 14, in operation S300, the first imaging unit 110 may capture an image including an object. The captured image may be a preview image.

In operation S310, the image processing device 100 may display a captured image on the display 120.

In operation S320, the second imaging unit 140 of the image processing device 100 may capture an image of eyes of a user viewing the display 120.

In operation S330, the image processing device 100 may determine whether a predetermined condition is satisfied and then repeat the operations of S300 to S320, or generate a motion picture by using a gaze map and a captured image generated in operations S340 and S350. The predetermined condition may be an input of a signal based on a predetermined time or a user's motion.

For example, when the image captured by the first imaging unit 110 is a preview image, a gaze map may be generated for the preview image captured for a predetermined time and a motion picture may be generated based on the gaze map. In other words, when the preview image displayed on the display 120 is viewed over a predetermined time without an input of a capturing manipulation button by the user, a motion picture based on the gaze map may be generated and stored in the storage 130. Also, when image capturing ends due to, for example, the turning-off of the first imaging unit 110, a motion picture may be generated based on the gaze map and stored in the storage 130.

In another example, a motion picture may be generated based on the gaze map by using a captured preview image, by inputting a separate manipulation signal, not for capturing a still image or a motion picture, with respect to the preview image captured by the first imaging unit 110.

When the predetermined condition is satisfied, in operation S340, the gaze map generator 150 may generate a gaze map including information about the gaze zone on the display 120 according to passage of time by using the captured image of the eyes of the user. The gaze map generator 150 may detect a change in the gaze zone for a particular time interval by processing the image of the eyes, and generate a gaze map by using the detection change in the gaze zone.

Alternatively, although in operation S340 the captured image is assumed to be displayed on the display 120, when the display 120 is embodied by a transparent display, the gaze map generator 150 may detect a direction in which the user gazes through the display 120, and generate a gaze map by converting the detected gaze direction to information about a gaze zone in the image captured by the first imaging unit 110. Accordingly, the captured preview image is not necessarily displayed on the display 120.

Alternatively, in the present exemplary embodiment, the gaze map is not necessarily limited to be generated after the predetermined condition is satisfied. For example, when the image processing device 100 enters a motion picture capturing mode, the gaze map is initialized. While the operations S300 to S330 are repeated, the gaze map is updated and thus the gaze map may be completed.

In S350, the image processor 160 may generate a motion picture by using the generated gaze map and the captured image in operation S300. The motion picture may be a thumbnail motion picture or a slideshow image.

For example, the image processor 160 may read the gaze zone at each particular time interval of the gaze map, and generate a motion picture that provides an animation effect of enlarging, reducing, or moving the stored still image according to the read gaze zone.

In another example, the image processor 160 may read the gaze zone at each particular time interval of the gaze map, and generate a plurality of cropped images by cropping a predetermined area around the gaze zone read from the image stored at each time point. Accordingly, the image processor 160 may generate a motion picture by incorporating the cropped images.

According to the above-described exemplary embodiment, a thumbnail image or an edition image based on the user's gaze may be automatically generated with only image capturing. Furthermore, when the user reproduces/edits a captured still image or motion picture later, user's gaze experience according to time during actual capturing may be reproduced. Accordingly, the user may have a great satisfaction.

As described above, according to the one or more of the above exemplary embodiments, the scene that a user actually saw during image capturing according to passage of time may be reproduced.

Also, the object on which the user focused his/her attention may be emphasized in the motion picture.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing device comprising:
   a first camera configured to capture an image of an object;
   a display configured to display the captured image;
   a second camera configured to monitor movements of eyes of a user; and
   a processor configured to control to:
      generate a gaze map including information about a gaze zone on the display based on the movements of the eyes monitored at a predetermined interval; and
      generate a motion picture based on the generated gaze map and the captured image.

2. The image processing device of claim 1, wherein the captured image is a preview image, and
   the processor is further configured to generate a motion picture based on the generated gaze map and the preview image.

3. The image processing device of claim 1, wherein the processor is further configured to detect a change in the gaze zone for a particular time interval by processing information of the movements of the eyes of the user and generate the gaze map based on the detected change in the gaze zone.

4. The image processing device of claim 1, wherein the processor is further configured to determine the gaze zone at each time point from the gaze map and generate a motion picture that provides an animation effect of enlarging, reducing, or moving the captured image according to the gaze zone in the captured image.

5. The image processing device of claim 1, wherein the first camera is further configured to capture a preview image until a still image capturing signal is input, capture a still image when the still image capturing signal is input, and store the captured still image in a storage.

6. The image processing device of claim 5, wherein the second camera is further configured to continuously capture the movements of the eyes of the user until the still image capturing signal is input.

7. The image processing device of claim 5, wherein the processor is further configured to determine the gaze zone at each time point from the gaze map, and generate a plurality of cropped images by cropping an area around the gaze zone from the stored still image.

8. The image processing device of claim 7, wherein the processor is further configured to generate the motion picture by incorporating the generated plurality of cropped images.

9. The image processing device of claim 5, wherein, when the gaze zone moves within a range equal to or less than a second threshold value for a time over a first threshold value, the processor enlarges the captured still image with respect to the gaze zone and crops the enlarged still image.

10. The image processing device of claim 9, wherein the gaze zone corresponds to a part of the object included in the stored still image, and
the processor is further configured to enlarge the stored still image at a magnification ratio calculated by using a ratio of an overall size of the object to an overall size of the stored still image.

11. The image processing device of claim 1, wherein the first camera is further configured to capture a motion picture and store the captured motion picture in a storage, the display is further configured to display a preview image of the motion picture captured by the first camera, and
the processor is further configured to edit the stored motion picture by using the generated gaze map.

12. The image processing device of claim 11, wherein the processor is further configured to determine the gaze zone at each time point from the gaze map, and crop an area around the gaze zone at a time point corresponding to each frame included in the stored motion picture.

13. The image processing device of claim 12, wherein the processor is further configured to generate a cropped motion picture by incorporating a plurality of cropped frames.

14. The image processing device of claim 13, wherein the processor is further configured to store the cropped motion picture in the storage.

15. The image processing device of claim 11, wherein the processor is further configured to determine importance for each frame of the stored motion picture based on the gaze map, and adjust a reproduction speed of the stored motion picture or emphasize at least one frame based on the determined importance when a user interface for reproducing or editing the stored motion picture is provided.

16. An image processing method comprising:
capturing an image of an object by a first camera;
displaying the captured image on a display;
monitoring movements of eyes of a user by a second camera;
generating a gaze map including information about a gaze zone on the display based on the movements of the eyes monitored at a predetermined interval; and
generating a motion picture based on the generated gaze map and the captured image.

17. The image processing method of claim 16, wherein the captured image is a preview image, and the generating the motion picture comprises generating the motion picture based on the generated gaze map and the preview image.

18. The image processing method of claim 16, wherein the generating the motion picture comprises:
determining the gaze zone at each time point from the gaze map; and
generating a plurality of cropped images by cropping an area around the determined gaze zone corresponding to the time point at each time point in the captured image.

19. The image processing method of claim 18, wherein the generating the motion picture comprises generating the motion picture by incorporating the plurality of generated cropped images.

20. The image processing method of claim 16, wherein the capturing the image comprises:
capturing a preview image until a still image capturing signal is input;
capturing a still image when the still image capturing signal is input; and
storing the captured still image in a storage.

21. The image processing method of claim 20, wherein the gaze zone corresponds to a part of the object included in the stored still image, and
the capturing the still image comprises:
enlarging the stored still image at a magnification ratio calculated by using a ratio of an overall size of the object to an overall size of the stored still image when the gaze zone moves within a range equal to or less than a second threshold value for a time over a first threshold value; and
cropping the enlarged still image.

22. The image processing method of claim 16, wherein the capturing the image comprises capturing a motion picture and storing the captured motion picture in a storage,
the displaying the captured image comprises displaying a preview image of the captured motion picture, and
the generating the motion picture comprises editing the stored motion picture based on the generated gaze map.

23. The image processing method of claim 22, wherein the editing the stored motion picture comprises:
determining the gaze zone at each time point from the gaze map; and
cropping an area around the determined gaze zone at a time point corresponding to the frame at each frame included in the stored motion picture.

24. The image processing method of claim 23, wherein the editing the motion picture comprises:
generating a cropped motion picture by incorporating a plurality of cropped frames; and
storing the cropped motion pictures in the storage.

25. The image processing method of claim 22, wherein the editing the motion picture comprises:
determining importance for each frame of the stored motion picture based on the gaze map; and
adjusting a reproduction speed of the stored motion picture or emphasizing at least one frame based on the determined importance when a user interface for reproducing or editing the stored motion picture is provided.

26. A non-transitory computer readable storage medium storing a program that is executable by a computer to perform the method of claim 16.

* * * * *